United States Patent [19]

Sacks

[11] Patent Number: 4,602,665

[45] Date of Patent: Jul. 29, 1986

[54] TIRE-LOCKING CLIP

[75] Inventor: Martin B. Sacks, Claypool, Ind.

[73] Assignee: Sun Metal Products, Inc., Warsaw, Ind.

[21] Appl. No.: 728,679

[22] Filed: Apr. 29, 1985

[51] Int. Cl.⁴ .......................... B60B 21/00; B60B 21/10
[52] U.S. Cl. ................................ 152/375; 152/379.5; 152/513; 301/97
[58] Field of Search .................................. 301/86–89, 301/95–98, 5 B; 152/375, 379.3, 379.5, 393–395, 397, 398, 383, 304, 501, 513, 539, 544, 541–543, 546, 555, 372, 362 R

[56] References Cited

U.S. PATENT DOCUMENTS

| | | | |
|---|---|---|---|
| 1,276,802 | 8/1918 | Overman | 152/513 X |
| 1,434,742 | 11/1922 | Haggman | 152/375 |

FOREIGN PATENT DOCUMENTS

| | | | |
|---|---|---|---|
| 599074 | 12/1933 | Fed. Rep. of Germany | 152/513 |
| 1002210 | 2/1957 | Fed. Rep. of Germany | 152/513 |
| 152319 | 11/1955 | Sweden | 152/539 |
| 18886 | of 1889 | United Kingdom | 152/384 |

*Primary Examiner*—David A. Scherbel
*Attorney, Agent, or Firm*—John S. Fosse

[57] ABSTRACT

A clip for locking pneumatic tires to mounting rims which includes a base plate adapted for attachment to the rim root wall and a pair of arms disposed at the opposite ends of the base plate. Cleats are disposed on each of the clip arms, including tooth elements projecting inwardly of the rim sidewalls for indentably engaging the confronting sidewalls of the tire casing which is mounted on the wheel rim.

3 Claims, 4 Drawing Figures

TIRE-LOCKING CLIP

FIELD OF THE INVENTION

This invention relates generally to wheel rims for pneumatic tires and more particularly to tire-positioning devices for bicycle wheel rims.

BACKGROUND OF THE INVENTION

In order to enhance their ground-gripping abilities, tires for mountain and trail bikes are commonly operated at low inflation levels. However, at rapid acceleration rates and at abrupt braking speeds, this practice produces a tendency for the frictionally-coupled tire and inner tube to rotate slightly relative to the mounting rim, especially on pavement and other hard surfaces. This relative rotation causes damage to the valve stem which protrudes through a hole in the root wall of the rim and, in extreme cases, may result in tearing the valve stem completely out of the tube. No satisfactory solution to this problem has been presented heretofore.

Accordingly, an important object of the present invention is to provide a simple device which can be assembled to a lightweight wheel rim and which serves to lock the corresponding tire casing and the rim together as a unit without seriously hampering subsequent de-mounting of the tire.

A more general object of the invention is to provide a new and improved locking device for positively positioning a tire on a lightweight rim.

Another object of the invention is to provide a tire locking clip which can be retro-fit on existing rims.

These and other objects and features of the invention will become apparent from a consideration of the following descriptions.

BRIEF DESCRIPTION OF THE DRAWING

The invention, both as to its construction and its mode of use, will be better understood by reference to the following disclosure and drawing forming a part thereof, wherein.

DETAILED DESCRIPTION OF THE INVENTION

Figure 1:
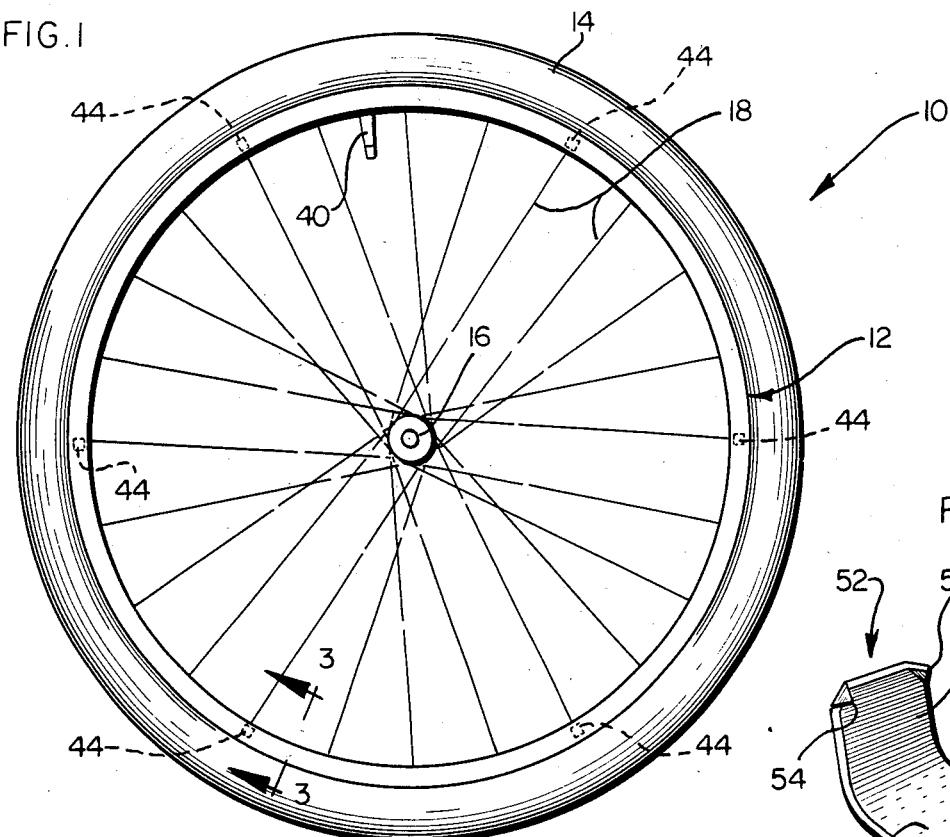
FIG. 1 is a side elevational view of a lightweight bicycle wheel assembly incorporating tire-locking clips constructed in compliance with the present invention.
Figure 3:
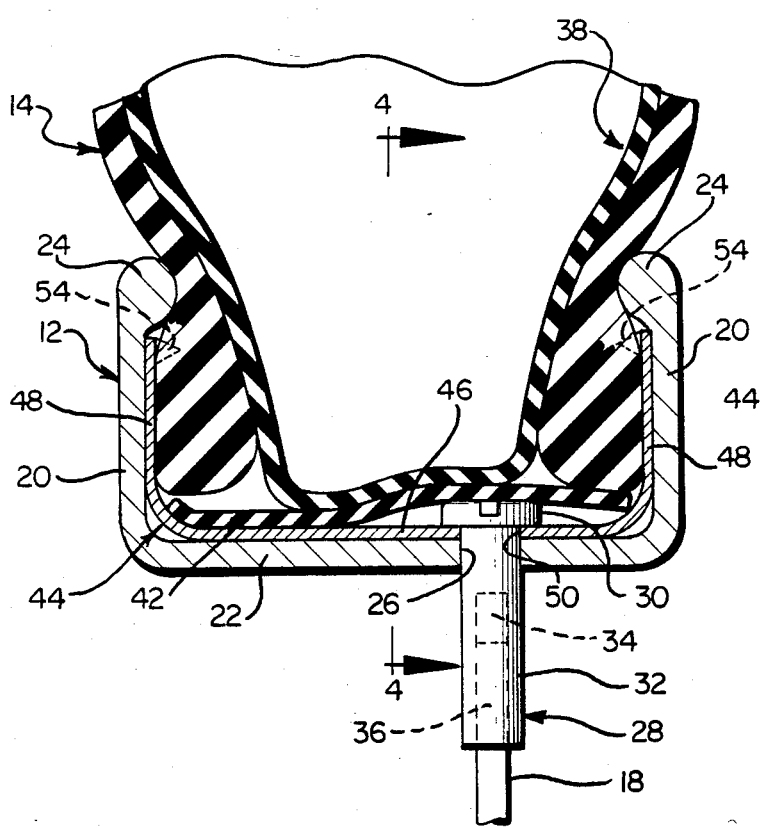
FIG. 3 is an enlarged, cross-sectional view taken substantially along the Line 3—3 of FIG. 1 to show permanent positioning of the locking clip in the wheel rim and the indentable engagement of the tire body by the clip.
Figure 4:
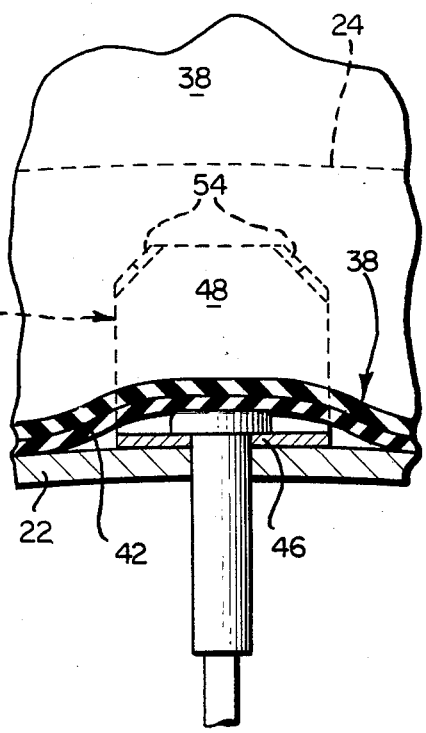
FIG. 4 is a sectional view taken substantially along the Line 4—4 of FIG. 3.

Referring now in detail to the drawing and giving first attention to FIG. 1, a lightweight bicycle wheel assembly indicated generally by the reference numeral 10 comprises an annular rim 12 of channel-shaped section, a tube-type rubber tire body or casing 14 which is mounted on the rim 12, a journalled hub 16, and a plurality of wire spokes 18 which are tightly laced or tensioned between the hub 16 and the rim 12. With reference to FIG. 3, the annular rim 12, fabricated for example as an aluminum alloy extrusion, includes a pair of spaced, annular sidewalls 20 which are connected by an integral, annular root wall or floor 22. Each of the spaced sidewalls 20 terminates in a bulbous edge or bead 24; and the root wall 22 is perforated with a series of arcuately arrayed holes 26 which are disposed on alternate sides of the mid-line of the rim 12 in accordance with conventional practice. In addition, the wire spokes 18 are specifically attached to the rim 12 by individual spoke nipples 28 which are slidably passed through the rim floor holes 26. Each of the nipples 28 includes a radially enlarged head 30, which is transversely slotted or otherwise provided with a tool-engagable recess, and additionally includes a shank portion 32 which has an internally threaded, blind bore 34 for progressively engaging a cooperatively threaded end 36 of a wire spoke 18.

In further accord with conventional practice, the free edges of the tire body 14 are situated between the spaced sidewalls 20 of rim 12; and an inflatable, toroidal inner tube 38 is fitted within the tire body, the inner tube 38 including a valve stem 40 which protrudes radially inwardly from the rim through a hole drilled in the floor 22 of the rim for that purpose. If desired, a soft rubber rim liner 42 may be disposed between the inner tube 38 and the heads 30 of the spoke nipples 28 in order to protect the material of the inner tube from mechanical damage occasioned by the tool-engagable recesses in the nipple heads 30.

Figure 2:
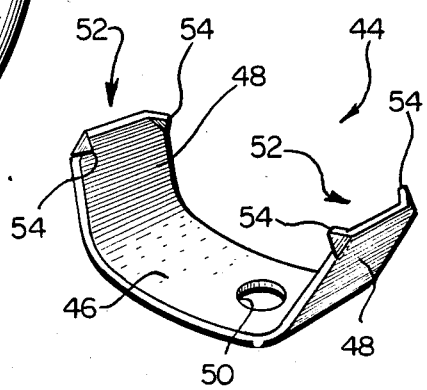
FIG. 2 is an enlarged perspective view of one of the tire locking clips.

In compliance with the present invention, a suitable number of tire-locking clips 44, fabricated from spring metal material, are snapped into place in the rim 12 beneath the edge beads 24; and in FIG. 1, six such locking clips are shown equally arcuately spaced about the rim 12. With reference to FIG. 2, a tire locking clip 44 is stamped or otherwise fabricated from a suitable spring metal as a unitary or one-piece element to include a base plate 46 and a pair of oppositely disposed arms 48 which are flared outwardly from the base plate 30 in the relaxed condition of the part. An eccentrically located hole 50 is perforated in the base plate 46 to pass the shank of a spoke nipple as described hereinabove; and in accord with the principles of the instant invention, cleat means 52 are fashioned at the free ends of the arms 48. Specifically, each of the corners of the arms 48 is inturned or bent over and the edges are sharpened to make the corners into pointed teeth 54 for optimizing indentable engagement of the sidewall of tire casing 14. As will be appreciated, the eccentric location of the hole 50 allows reverse positioning of the locking clips 44 to accommodate the staggered positioning of the spoke nipples 28 in the floor of wheel rim 12.

In use, the locking clips 44 are mounted in the channel of rim 12 at the time that the spokes 18 are being originally laced in position using the spoke nipples 28; and it will be appreciated that secure, temporary positioning of the locking is achieved by virtue of the spring action of the material of the clip and the flaring nature of the arms 48. When the clips are snapped into the channel of the wheel rim, the tips of the arms 48 are forced toward each other and the arms themselves into generally upright condition as shown in FIG. 3; and the resilient resistance of the spring material to this compression tends to hold the clip frictionally in place against the sidewalls 20 of the wheel rim until the spoke nipples are mounted in place to permanently secure the position of the clips. It will be appreciated that a suitable number of the locking clips can also be installed in existing wheel assemblies merely by removing a selected number of the spoke nipples and fitting the clips in place as described.

When the assembled tire casing and inner tube are mounted on the wheel rim, the teeth 54 of the locking clips will indentably engage the elastomeric material of the tire casing as shown in FIG. 3, tending to fasten the tire casing to the rim for rotation therewith. It is to be appreciated that the locking clips, by virtue of their indentable engagement with the tire casing, resist any tendencies of the forces of wheel acceleration or deceleration from causing rotation of the assembled tire and inner tube relative to the mounting rim. As a consequence, damage to the valve stem 40 of the frictionally coupled inner tube is effectively prevented.

The drawing and the foregoing descriptions are not intended to represent the only form of the invention in regard to the details of its construction and manner of use. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A tire-locking clip and wheel rim assembly comprising wheel rim which includes an annular root wall or floor and a pair of spaced-apart, annular sidewalls extending radially outwardly from said root wall, the outer edges of said sidewalls terminating in annular beads which project inwardly of the respective sidewalls to form tire-mounting shoulders, said tire-locking clip comprising a base plate adapted for attachment to said rim root wall in substantially surface-to-surface relationship therewith; a pair of arms disposed at the opposite ends of said base plate and adapted to be wedged against the respective rim sidewalls beneath the beads thereof; and cleat means on each of said arms, including tooth elements projecting inwardly of the rim sidewalls for indentably engaging the sidewalls of a tire mounted on the wheel rim.

2. A tire-locking clip and wheel rim assembly according to claim 1 wherein said base plate, said arms and said cleat means are of one-piece fabrication from spring-metal material for temporary, snap-action assembly of the clips in the wheel rim.

3. A tire-locking clip and wheel rim assembly to claim 1 wherein said base plate includes an eccentrically disposed hole adapted to receive a spoke nipple in attaching said clip to said rim.

* * * * *